United States Patent [19]

Ecker et al.

[11] Patent Number: 4,565,111

[45] Date of Patent: Jan. 21, 1986

[54] DEVICE FOR ROTATING AND AXIALLY MOVING A BOLT

[75] Inventors: Karl-Heinz Ecker, Erkelenz; Erhard Hoffmann, Hückelhoven, both of Fed. Rep. of Germany

[73] Assignee: Wirth Maschinen-und Bohrgerate-Fabrick GmbH, Erkelenz, Fed. Rep. of Germany

[21] Appl. No.: 612,639

[22] Filed: May 21, 1984

[30] Foreign Application Priority Data

May 25, 1983 [DE] Fed. Rep. of Germany ....... 3318941

[51] Int. Cl.$^4$ .............................................. B25B 13/50
[52] U.S. Cl. .................................... 81/53.2; 81/57.38; 81/436
[58] Field of Search ...................... 81/57.38, 53.2, 436, 81/460, 461

[56] References Cited

U.S. PATENT DOCUMENTS

| | | |
|---|---|---|
| 3,923,088 | 12/1975 | Arnn ...................................... 81/436 |
| 4,094,350 | 6/1978 | Jacobson . |
| 4,118,849 | 10/1978 | King, Jr. . |
| 4,304,156 | 12/1981 | Boudet et al. .......................... 81/53.2 |
| 4,339,971 | 7/1982 | Zatorre . |
| 4,362,413 | 12/1982 | Heard et al. . |
| 4,380,181 | 4/1983 | Bunyan . |

FOREIGN PATENT DOCUMENTS

| | | |
|---|---|---|
| 684086 | 9/1966 | Belgium . |
| 243352 | 2/1912 | Fed. Rep. of Germany . |
| 730710 | 1/1943 | Fed. Rep. of Germany . |
| 918990 | 10/1954 | Fed. Rep. of Germany . |
| 1156718 | 10/1963 | Fed. Rep. of Germany . |
| 1157435 | 11/1963 | Fed. Rep. of Germany . |
| 2033556 | 7/1971 | Fed. Rep. of Germany . |
| 2113933 | 10/1971 | Fed. Rep. of Germany . |
| 2822382 | 11/1979 | Fed. Rep. of Germany . |
| 3131703 | 3/1983 | Fed. Rep. of Germany . |
| 347044 | 7/1960 | Switzerland .......................... 81/436 |

Primary Examiner—James L. Jones, Jr.
Attorney, Agent, or Firm—Holman & Stern

[57] ABSTRACT

The device for rotating and axially moving a bolt comprises the bolt and a coupling part engageable with the end of the bolt wherein the bolt has a chamber which is accessible from the front end and is provided with at least one tangential abutment and at least one axial abutment for a head with a transverse projection on the coupling part.

18 Claims, 4 Drawing Figures

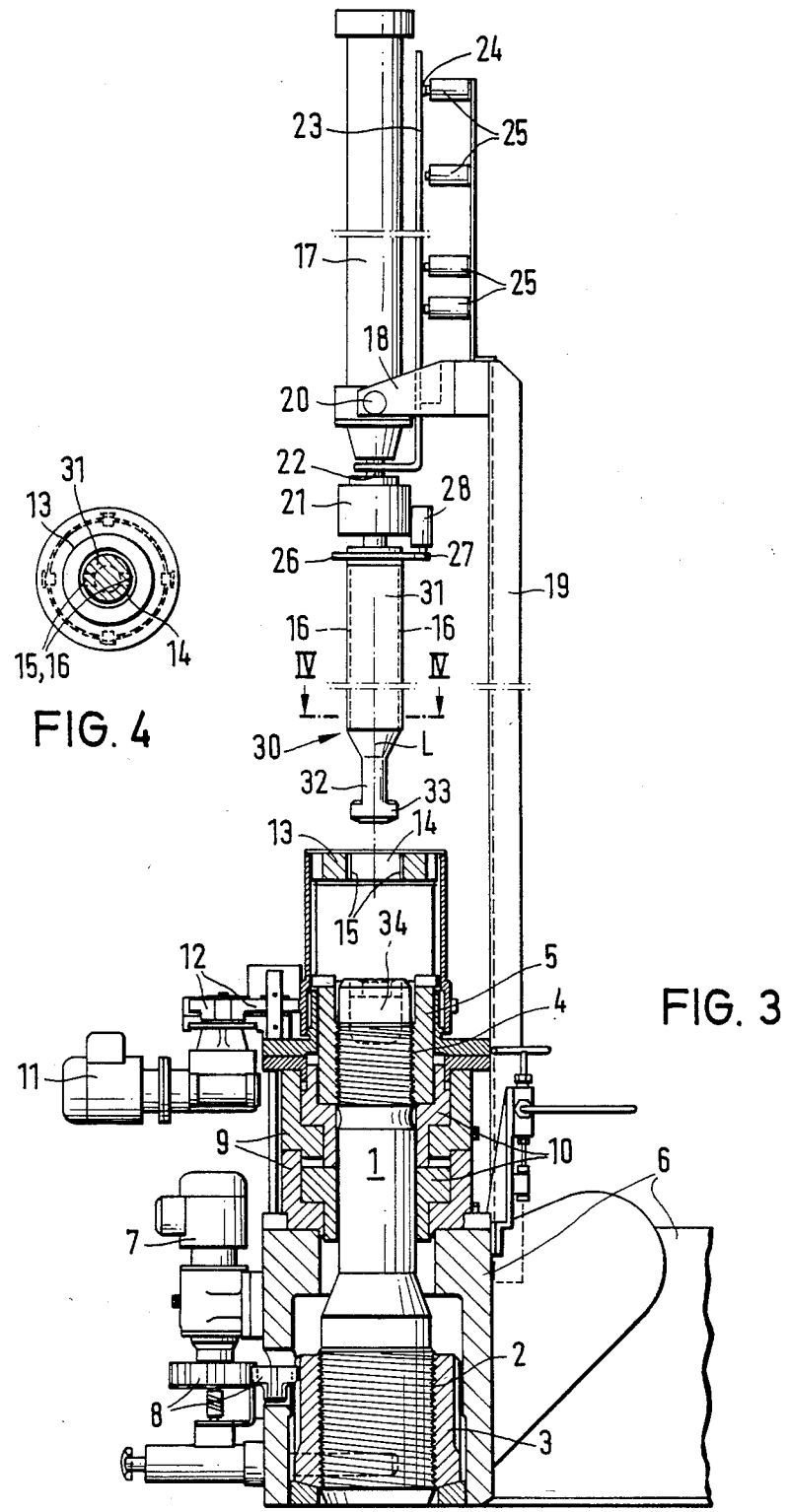

DEVICE FOR ROTATING AND AXIALLY MOVING A BOLT

BACKGROUND TO THE INVENTION

1. Field of the Invention

The invention relates to a device comprising a bolt which is to be inserted into a receiving hole, e.g. a screw bolt which is to be screwed into a threaded bore, and an axially displaceable coupling part which may be brought to engage at the end part of the bolt, may be driven so as to rotate, and by means of which a rotational movement and an axial force, in particular simultaneous at least at times, may be transmitted to the bolt.

2. Description of the Prior Art

Screw connections to flanges, covers, and closures of pressure containers, reactor vessels, and the like are in many instances, constructed in such a way that the front-end closing surface or a flange of a vessel has threaded bores which are disposed on a bolt hole circle and into which screw bolts formed as stud bolts are screwed by means of their ends. The bolts pass through corresponding holes in the flange of a cover, which is mounted on the vessel. Securing nuts are screwed onto threads on the projecting parts of the bolts so that the desired connection of the parts is made. In these and similar connections there is frequently the necessity, when screwing the bolts into their receiving threads or when screwing them out, for the screwing procedures to be carried out by suitable apparatus with as little use of manual work as possible. This applies in particular for large and heavy screw bolts and for those screw connections which are in danger regions, such as for example in nuclear reactors. In order to prevent damage to the thread when screwing out or in, it is furthermore desirable or necessary, during rotating, to apply an axial pulling force, which if possible can support the full weight of the bolt so that the thread is accordingly relieved.

In order to achieve this there must be a coupling system which is capable of transmitting a torque delivered by a drive and a pulling force delivered by a further device to the bolt. In this respect there is usually also the requirement that the coupling system can be completely detached from the bolt and can also be reconnected thereto according to the circumstances.

Previously, for such purposes, various elements engaging at a number of outer places on the bolt were used. For this the bolt had to have corresponding profiled sections for locking parts, for attaching keys etc.

SUMMARY OF THE INVENTION

The object of the invention is to overcome previously existing difficulties and to provide an advantageous apparatus of the above mentioned type which is also suitable for special practical applications and which furthermore also satisfies existing guidelines and provisions, as they exist for special systems. A further object of the invention is also to provide an advantageous and simple construction of the apparatus in detail.

The invention provides that in the bolt there is a chamber accessible from its front end, the coupling part has a shaft and a head with at least one projection projecting transversely to the longitudinal axis, and the chamber is equipped with at least one radial (tangential or circumferential) abutment and at least one axial abutment for the head or projection of the coupling part.

In an apparatus of this type, a part at the end of the bolt, which was previously not used, is used to form a connection enabling the introduction of torques and axial forces. On the outer side the bolt is not influenced thereby and therefore can be formed in a way in which it best corresponds to the particular application. The basic inventive idea is seen in that the coupling part is inserted by means of its head into the chamber; it can then be brought into a locked operating position by rotation and displacement, it also being possible to combine or superpose these two movements, and in this position the torques and axial forces may be transmitted. Accordingly, any construction corresponding to this principle falls within the scope of the invention.

A tangential abutment can be formed by the lateral surface of a groove or the like present in the chamber. An axial abutment can be formed by a projection or the like protruding into the chamber or partially closing the latter, against which a surface of the head or projection of the coupling part comes to rest. The construction can also be particularly in the manner of a bayonet lock.

In many applications it may be sufficient to provide only one projection, directed towards one side, on the head of the coupling part. Advantageously, however, two projections directed towards opposite sides are present. Particularly favorable is a hammer head type construction.

In an advantageous construction, the chamber is delimited by a front-end closing part which has an aperture allowing the head of the coupling part to pass through axially only at a specific angle relative to the longitudinal axis of the coupling part or the shaft. A closing part of this type which in particular forms an axial abutment for the head of the coupling part, may consist of one part with the end of the bolt or may also be produced as a separate part and then be connected to the bolt either detachably or rigidly.

In one advantageous construction at least one first tangential abutment extends substantially over the entire height of the chamber and at least one second tangential abutment extends over only part of the height of the chamber in the upper region thereof, the abutments being at a distance from each other which allows the introduction of a projection of the head of the coupling part between them. This distance is advantageously only large enough to ensure unobstructed movement of the head, so that no larger movements of the head are possible therebetween.

In a very simple construction, which is also favorable for manufacture, at least one tangential abutment is formed by a pin or the like.

The production of a rotational movement and an axial force, which are to be transmitted by way of the coupling part to the bolt, may occur in various ways. Even for the introduction of the torques and forces into the coupling part itself there are a number of possibilities.

In an advantageous development, the coupling part has a member connected to the shaft and an outer profile, the member being insertable into an entrainment ring, which may be driven so as to rotate, with on inner profile which fits into the outer profile of the member, the aperture of the entrainment ring being sufficiently large to allow the head of the coupling part to pass through.

The device according to the invention may be formed as a handling or actuation apparatus for a single bolt or may be formed in a multiple arrangement for the simultaneous handling of a plurality of bolts. It can be combined in particular with a screw tightening apparatus, such as those known in various constructions. Furthermore, the device according to the invention is not only suitable for screw bolts but also for bolts which are secured in their receiving holes in another manner, for example by means of interrupted annular projections and grooves, which may be locked with a corresponding counter-profile.

BRIEF DESCRIPTION OF THE DRAWINGS

Further details, features, and advantages of the invention can be seen in the following description of the preferred embodiment with reference to the accompanying drawings wherein:

FIG. 3 is an elevational view of a screw tightening apparatus equipped with the device of FIG. 1, partly in cross-section; and FIG. 4 is cross-sectional view taken along the line IV—IV in FIG. 3.

DESCRIPTION OF PREFERRED EMBODIMENT

Figure 1:
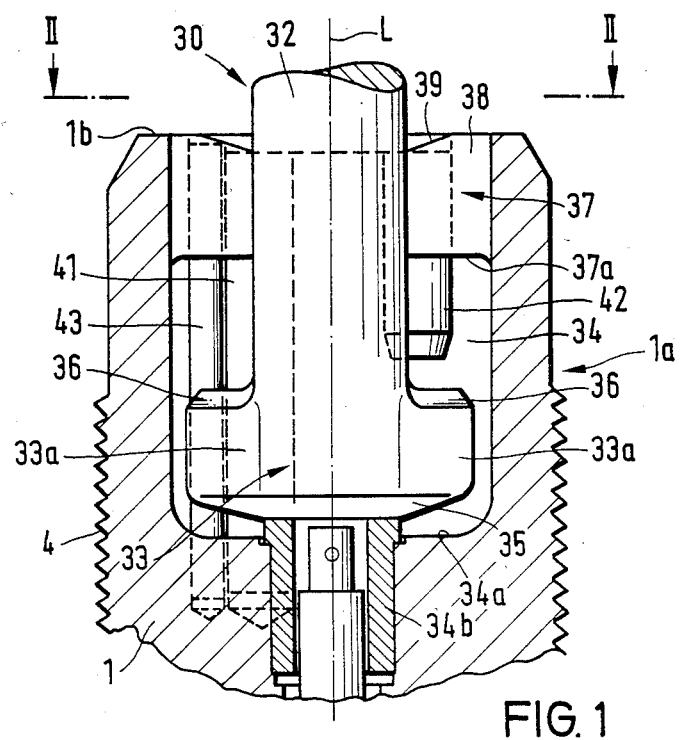
FIG. 1 is a cross-sectional view of the upper end of a bolt taken along the line I—I in FIG. 2, together with a coupling part.
Figure 2:
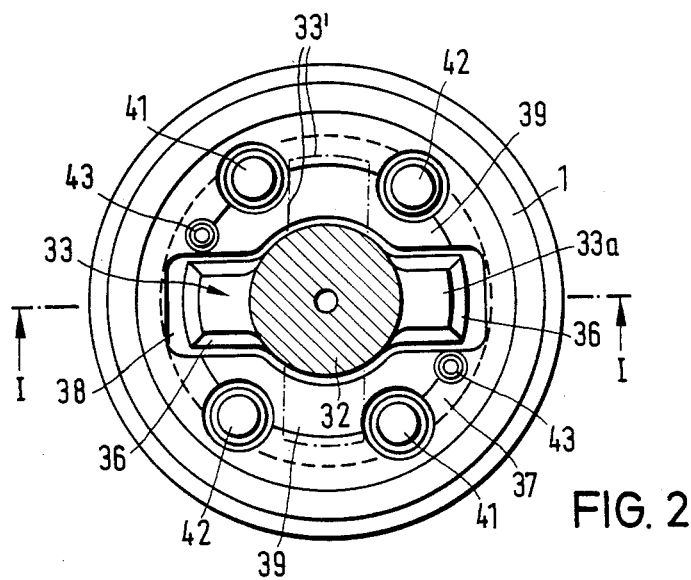
FIG. 2 is a top plan view of FIG. 1 with a cross-section through the shaft of the coupling part taken along the line II—II in FIG. 1.

The bolt 1, whose free end 1a is shown in FIGS. 1 and 2, is in particular a large screw bolt, as is used in great numbers in particular with flanges, covers, or similar closures of pressure containers, boilers, and reactor vessels. A screw bolt of this type formed in the manner of a stud bolt has, on its part not shown in the drawings, an outer thread by means of which it may be screwed into a corresponding threaded bore. Onto a further thread 2 of a bolt of this type a securing nut 3 (FIG. 3) may be screwed, which is disposed on the upper side of a flange or cover. In order to pre-tension such bolts hydraulic tightening apparatus is used which for example engages on a further nut 5, screwed onto an upper thread 4 of the bolt 1.

A construction of a tightening apparatus shown by way of example in FIG. 3 comprises a bearing member 6, which may be mounted onto the upper side of a cover flange, a drive 7 (for example an electromotor) with gears 8 connected downstream for rotating the securing nut 3, provided on the outside with toothing, on the bolt 1, further tightening cylinders 9, disposed above one another, with stepped pistons 10, the upper of which lies against the lower side of the tightening nut 5 screwed onto the thread 4, and a rotary drive 11 (e.g. also an electromotor) with gears 12 connected downstream and a sleeve, which has toothing on the outside and surrounds the nut 5, as the rotary drive for the tightening nut 5 and at the same time for an entrainment ring 13 which is disposed at a certain distance above this nut 5 and is carried by supports or the like.

In the entrainment ring 13 there is an aperture 14 with an inner profile 15, in particular in the form of two diametrically opposed and axially extending projections, strips, or the like, with which an outer profile 16, in particular grooves for receiving the projections or strips on the entrainment ring 13, on the body 31 of a coupling part 30 corresponds. The latter part is displaceable in the direction of its longitudinal axis L by means of a hydraulic piston-cylinder unit 17, as a result of which the body 31 may be made to engage, with its outer profile 16, in the inner profile 15 of the entrainment ring 13. In this engagement position the coupling part 30 may therefore be rotated by the drive 11 in both directions of rotation. The piston-cylinder unit 17 is held pivotally by a fork-shaped holder 18 on a frame 19, connected to the bearing member 6, in pivots 20, but cannot rotate about its longitudinal axis L. Reference numeral 21 denotes a diagrammatically indicated connection and bearing arrangement in its entirety. In the latter, the upper end of the coupling part 30 is supported in such a way that it can rotate about its longitudinal axis L and furthermore is connected to the end of a piston rod 22 of the dual-acting piston-cylinder unit 17 in order to transmit axial forces in both directions.

A cam strip 23 with one or more adjustable cams 24 is attached to the piston rod 22 in order to actuate switches 25 in dependence upon the path in which the piston rod 22 and therefore also the coupling part 30 travels. A gear 26 secured to the upper end of the body 31 engages with a pinion 27 of an electrical angle indicator 28 which is attached to the connection and bearing arrangement 21 such that it is moved axially with the latter and the coupling part 30. Therefore in each case the rotational movement of the coupling part 30 or its angular position and the axial movement or position of the coupling part 30 are recorded and indicated exactly by means of this angle indicator 28 and by means of the switches 25, respectively the signals from which can be further processed and used to control a desired operating cycle. This may be a programmed automatic cycle. The means necessary for this are available and will be known to the person skilled in the art.

A shaft 32, which is for example cylindrical, is connected to the body 31 of the coupling part 30 towards the bottom and ends in a head 33. The head is formed in the manner of a hammer head in the advantageous construction shown, so that there are two projections 33a transverse to the longitudinal axis L of the coupling part or the shaft 32. The aperture 14 in the entrainment ring 13 is sufficiently large for the head 33 of the coupling part 30 to pass freely through when the latter is moved axially.

As FIGS. 1 and 2 show particularly clearly, in the upper end 1a of the bolt 1 there is a chamber 34 which is accessible from the front end 1b. The chamber is delimited by a closing part 37 which has an aperture 38 which is somewhat larger than the head 33 with the shaft 32, but has such a shape and arrangement that it is possible for the head 33 to pass through axially only at a specific angular position, as can be clearly seen in FIG. 2.

The closing part 37 which in the shown construction consists of one part with the bolt 1, but may also be produced separately and then be connected to the bolt, has on its upper side inclined regions 39, i.e. formed by conical partial surfaces, which regions may be used to guide the head 33 before the introduction thereof into the aperture 38. For the same purpose, the head 33 also has at its lower end, i.e at parts of its lower side, inclined regions 35. Advantageously moreover, at the upper side of the head 33 there are inclined parts 36 which may facilitate passage into the aperture 38 during the reverse movement.

In the interior of the chamber 34, tangential (or circumferential) abutments for the head 33 or its projections 33a are provided in such a way that the parts are able to engage in a locking manner in order to carry out a joint movement of the coupling part 30 and the bolt 1. In the advantageous construction shown in FIGS. 1 and 2, two of the tangential abutments are formed by pins 41 which extend over the entire height of the chamber 34, are diametrically opposed to one another (FIG. 2), and are held by means of their upper ends in bores of the closing part 37 and by means of their lower ends in bores, in the material of the bolt 1, originating in the base 34a of the chamber 34. The pins may in particular be pressed into the bores. Two further pins 42, held in bores of the closing part 37, extend over only part of the height of the chamber 34, as FIG. 1 shows. These pins 42 are also diametrically opposed to each other. They are in each case at a horizontal distance from the pins 41 which is somewhat greater than the width of the projections 33a of the head 33.

Furthermore, two more diametrically opposed thinner pins 43 extending over the entire height of the chamber 34 are provided and are also held at their ends in like manner to the pins 41. The pins 43 are in each case disposed directly on the edge of the aperture 38 and are additionally used as stops or to guide the head 33 when it moves. They are not absolutely necessary but may increase secureness or facilitate the operation.

The method of operation of the above-described apparatus is as follows.

Starting from one position of the parts according to FIG. 3 the dual-acting piston-cylinder unit 17 is actuated in such a way that the piston rod 22 slides out and as a result of this the coupling part 30 is moved downwards. Its head 33 thus passes through the aperture 14 in the entrainment ring 13 and then reaches the bolt 1. The reaching of specific positions may be indicated by the compulsory actuation of the switches 25. If the head 33 is at the correct angle over the aperture 38 in the bolt end, the axial movement is continued. Otherwise firstly by slowly rotating the coupling part 30 by means of the drive 11 the correct angle is arrived at, the member 31 firstly engaging with the entrainment ring 13. While rotating, the lower side of the head 33 may slide on the regions 39 of the closing part 37. Then the head 33 passes into the chamber 34. The further downward movement (when the rotary drive is switched off) may be ended by the head 33 bearing on the base 34a of the chamber 34 or on a sleeve 34b, which is inserted therein and is used for another purpose not explained in detail here, and by a pressure increase, which is necessitated thereby, but in particular by actuating the lowest of the switches 25 by means of a control command. Thus the state according to FIGS. 1 and 2 is produced.

Now the rotary drive 11 is switched on such that the coupling part 30 and therefore the head 33 rotates in an counter-clockwise direction, until the position shown in FIG. 2 with the dash-dotted line 33' is reached, which may be effected by switching off the rotary drive 11 in dependence on the signals of the angle indicator 28. During this rotation, the projections 33a of the head 33 pass without obstruction under the ends of the shorter pins 42. There now follows an upwards movement of the coupling part 30, it being possible to displace the projections 33a of the head 33 in the region between the pins 41 and 42, until the flat parts of the upper sides of the projections 33a come to rest against the axial abutment constituted by the flat lower side 37a of the closing part 37. The reaching of this position may also be indicated by one of the switches 25 or by other sensors or the like, whereupon a command may be given to commence the screwing out procedure. For this, the rotary drive 11 is switched on and the piston-cylinder unit 17 is supplied with pressure medium such that an axial upwards force is produced and is transmitted by way of the head 33 of the coupling part 30 to the bolt 1. Owing to the fact that the lateral faces of the head 33 come to bear against the tangential abutments 41 the torque is transmitted to the bolt 1. The bolt is therefore screwed out of its threaded bore with weight relief until it is free and hangs in the apparatus. It may then be transported away by the apparatus.

Accordingly, the bolt 1 is screwed into its receiving bore in the reverse manner. For this, the coupling part 30 is rotated by means of the drive 11 in the other direction. Owing to the fact that the lateral faces of the projections 33a come to bear against the tangential abutments 42 the torque is transmitted to the bolt 1. Simultaneously weight relief occurs by supplying pressure medium to the piston-cylinder unit 17 in such a way that whilst lowering, during the screwing-in procedure, an upwardly directed axial force of a desired magnitude is maintained. After the end of the screwing-in procedure, the coupling part 30 is moved downwards when the drive 11 is switched off and then when the drive 11 is switched on again it is rotated until its head is in the position according to FIGS. 1 and 2. Then the head 33 is moved out of the chamber 34, for example until the parts reach the position according to FIG. 3. The pins 43 may be used as stops and guides when rotating back the head 33, as lastly mentioned, and when lifting the head. Departing from the construction shown, the pins 41 and 42 may be offset with respect to each other about another center angle.

Furthermore the construction may be such that a part containing the chamber is produced separately. This may have inter alia advantages with respect to manufacturing techniques. Such a part, forming to a certain extent a fixture or attachment for the bolt, can then be rigidly connected to the bolt, for example using a pinned fitting, by welding, or in any other suitable manner. In this way, for example the bolt may form the base of the attached chamber with its front end. In order to illustrate a construction of this type FIG. 1 may be taken into consideration, according to which it would then be possible for the original dividing line between the bolt and a fixture or attachment part to be approximately at the height of the upper edge of the sleeve 34b. The abutments may already be present in the separately produced fixture or attachment part or may also be produced or mounted after the latter has been attached to the bolt. It is further possible to fasten a searately manufactured part, containing the chamber, on the bolt so as to be detachable, in particular in a construction forming an actual adapter, with corresponding possibilities for adaptation and connection to the bolt end. In all the above-mentioned constructions, which all fall within the scope of the invention, the fixture or attachment part or adapter may also have a greater diameter than a bolt.

All the features mentioned in the above description or shown in the drawings are to be considered individually or in combination as coming within the scope of the invention, provided this is allowed by the known state of the art.

We claim:

1. In a device for rotating and axially moving a heavy screw bolt of the type which cannot be actuated manually wherein an axially displaceable coupling device is engageable with an accessible end part of the bolt, the improvement comprising:

a coupling device receiving chamber in the accessible end part of the bolt;

a shaft part on the coupling device having a longitudinal axis aligned with said chamber;

a head adjacent the end of said shaft insertable into said chamber;

at least one projection on said head projecting transversely to said longitudinal axis;

at least one axial abutment in said chamber operatively engageable axially with said head;

at least one first tangential abutment in said chamber extending over substantially the entire length of the chamber; and at least one second tangential abutment extending over only part of the length of said chamber in the region through which said head enters said chamber;

said tangential abutments being engageable with said projection and being spaced with respect to each other to allow said projection of said head to be introduced between said abutments.

2. The device as claimed in claim 1 wherein: said head is formed substantially in the shape of a hammer head.

3. The device as claimed in claim 1, and further comprising: a front-end closing element at the accessible end part of the chamber; and an aperture in said closing element having a configuration allowing the head of the coupling device to pass through axially only at a specific angle in relation to the longitudinal axis.

4. The device of claim 3, wherein said closing element forms said axial abutment.

5. The device of claim 3, wherein said closing element and accessible end part of the bolt comprise one integral piece.

6. The device of claim 3, wherein the side of said closing element nearest the accessible end of the bolt has regions inclined inwardly of the bolt towards the aperture.

7. The device of claim 1, wherein said head of the coupling device has inclined regions at least at its end facing the bolt.

8. The device of claim 1, wherein at least one of said tangential abutments comprises a pin.

9. The device of claim 1, further comprising at least one guide stop for said head of the coupling device in said chamber in addition to the tangential abutments.

10. The device of claim 9, wherein said guide stop comprises a pin.

11. The device of claim 1, wherein said chamber is provided in a separate part which is secured on the bolt.

12. The device as claimed in claim 1 and further comprising:

an entrainment ring rotatably mounted coaxially with respect to the bolt;

means to rotatably drive said entrainment ring;

an aperture in said entrainment ring sufficiently large to allow said head of the coupling device to pass therethrough;

an inner profile means on said entrainment means; and wherein said coupling device further comprises, an extension body part connected to said shaft insertable into said entrainment ring through said aperture, and an outer profile on said extension body part engageable with said inner profile, so that rotation of said entrainment ring rotates said coupling device.

13. A device as claimed in claim 1 wherein said pin is supported at one end in said closing element and at the other end in the bolt at the base of said chamber opposite to said accessible end part of the chamber.

14. In a device for rotating and axially moving a heavy screw bolt of the type which cannot be actuated manually wherein an axially displaceable coupling device is engageable with an accessible end part of the bolt, the improvement comprising:

a coupling device receiving chamber in the accessible end part of the bolt;

a shaft part on the coupling device having a longitudinal axis aligned with said chamber;

a head adjacent the end of said shaft insertable into said chamber, at least one projection on said head projecting transversely to said longitudinal axis;

at least one axial abutment in said chamber operatively engageable axially with said head;

at least one first tangential abutment in said chamber extending over substantially the entire length of the chamber;

at least one second tangential abutment extending over only part of the length of said chamber in the region through which said head enters said chamber;

said tangential abutments being engageable with said projection and being spaced with respect to each other to allow said projection on said head to be introduced between said abutments;

a closing element in the accessible end part of said chamber for partly closing that end of the chamber; and a pin in said chamber supported in said closing element.

15. The device as claimed in claim 14 wherein: said head is formed substantially in the shape of a hammer head.

16. The device as claimed in claim 14 and further comprising an aperture in said closing element having a configuration allowing said head to pass therethrough axially only at a specific angle in relation to said longitudinal axis.

17. The device of claim 14 wherein said closing element forms said axial abutment.

18. The device as claimed in claim 14 and further comprising:

an entrainment ring rotatably mounted coaxially with respect to the bolt;

means to rotatably drive said entrainment ring;

an aperture in said entrainment ring sufficiently large to allow said head of the coupling device to pass therethrough;

an inner profile means on said entrainment means, and wherein said coupling device further comprises, an extension body part connected to said shaft insertable into said entrainment ring through said aperture, and an outer profile on said extension body part engageable with said inner profile, so that rotation of said entrainment ring rotates said coupling device.

* * * * *